United States Patent [19]

Schlett et al.

[11] Patent Number: 4,656,146

[45] Date of Patent: Apr. 7, 1987

[54] ABRASION RESISTANT REFRACTORY COMPOSITION

[75] Inventors: Paul E. Schlett, Succasunna; John R. Peterson, Randolph, both of N.J.; James A. Caprio; Thomas R. Kleeb, both of Pittsburgh, Pa.

[73] Assignees: Exxon Research & Eng. Co., N.J.; Dresser Industries, Inc., Dallas, Tex.

[21] Appl. No.: 748,261

[22] Filed: Jun. 24, 1985

[51] Int. Cl.$^4$ .................... C04B 35/14; C04B 35/44
[52] U.S. Cl. .................................... 501/124; 501/125; 501/128; 501/129; 501/133
[58] Field of Search ............... 501/124, 125, 133, 128, 501/129

[56] References Cited

U.S. PATENT DOCUMENTS

| | | | |
|---|---|---|---|
| 3,607,325 | 9/1971 | Spangler et al. | 501/124 |
| 3,802,894 | 4/1974 | Prost et al. | 501/124 |
| 3,824,105 | 7/1974 | Capellman et al. | 501/125 |
| 4,244,745 | 1/1981 | Havranek et al. | 501/124 |
| 4,346,177 | 8/1982 | Cochet et al. | 501/124 |
| 4,506,025 | 3/1985 | Kleeb et al. | 501/124 |

*Primary Examiner*—Mark L. Bell

[57] ABSTRACT

A refractory composition characterized by abrasion resistance and low thermal conductivity comprising about 40 to about 96 weight percent amorphous silica, about 2 to about 50 weight percent −65 mesh calcined refractory aggregate having a density of at least about 140 lb/ft$^3$ and about 2 to about 40 weight percent calcium aluminate cement.

14 Claims, No Drawings

ABRASION RESISTANT REFRACTORY COMPOSITION

BACKGROUND OF THE INVENTION

This invention relates to a refractory composition characterized by high abrasion resistance and relatively low thermal conductivity, and in particular, to such a composition which may be used as refractory castable and gunning mixes.

Refractory castables are hydraulic setting compositions. They comprise granular refractory aggregates and chemical binders. The refractory castables are shipped in dry form, and when mixed with water to the desired consistency, may be poured like concrete, tamped or rammed into place, troweled or applied with an air gun. Refractory castables take a strong hydraulic set at room temperatures and maintain good strength until the desired ceramic bond is developed as the temperature is increased. Castables are specially suited for furnace linings of irregular contours, for patching brick work and for casting special shapes which may be urgently required. Numerous castable compositions are known, with each of the known compositions having different properties, making each one useful for different applications.

One such application involves the use of refractory castables in lining transfer lines employed in fluid catalytic cracking and fluid coking units used in petrochemical processes. In such units, highly abrasive catalysts or coke travel at high speeds thereby creating extreme erosion potential throughout the catalytic cracking unit. In such units, early abrasion resistant linings were of a dual layer construction consisting of dense hydraulic phosphate bonded refractory facing with insulating back-up which required extensive anchoring and hand ramming to install. To reduce the expense of dual layer linings, the refining industry began using castables of an intermediate density with field additions of stainless steel fibers which required less anchoring in the metal shell, and which could be poured relatively quickly. Although the foregoing improved on the time and cost of installation, lower conductivity was desired.

Abrasion resistant refractory linings in petrochemical vessels are typically chemically hydraulic or phosphate bonded refractory compositions. Abrasion resistance is generally obtained by utilizing a strong, dense refractory grain such as calcined fireclay or tabular aluminum, bauxite, MgAl and a strong bond consisting of aluminum orthophosphate or calcium aluminate cement. In the case of cement, the abrasion resistant bond is achieved by using large amounts of cement, or a combination of fumed silica, cement in amounts less than ten percent, and a surface active agent which allows flow at low water contents. Improved density and subsequent high thermal conductivity values, which are achieved by casting at low water contents results in a highly abrasion resistant bond at low cement levels.

In petrochemical applications, it is desirable that the refractory linings have low thermal conductivity properties. Unfortunately, both density and thermal conductivity generally are directly proportional so that when high bulk density and abrasion resistance are achieved, thermal conductivity is undesirably high. Both density and thermal conductivity may be lowered by the substitution of light weight grain for some of the calcined fireclay, but this has an adverse affect on abrasion resistance.

In addition to cast applications, gunning mixes are used in situations of limited access or where they offer advantages in application efficiency and in associated costs. Dense, homogeneous monolithic linings can be gunned without the use of forms and with a marked savings in time. Gunning mixes used in lining components of fluid catalytic cracking and fluid coking units should possess the same properties of low thermal conductivity and abrasion resistance as the refractory castables.

SUMMARY OF THE INVENTION

Accordingly, it is an object of this invention to provide a refractory composition characterized by high abrasion resistance and low thermal conductivity. The foregoing objective is achieved in a refractory composition comprising 40–96% by weight amorphous silica, 2–50% by weight −65 mesh calcined high density refractory fines, and 2–40% by weight calcium aluminate cement.

DESCRIPTION OF THE PREFERRED EMBODIMENT

The utilization of refractory castable compositions in highly abrasive environments requires the castables to have excellent abrasion resistance properties, so that unit operation is reliable and not subject to high maintenance. In addition, the refractories are also required to have relatively low thermal conductivity for certain applications to afford unit thermal efficiency. Previous work indicated that a composition including amorphous silica should be considered when developing a refractory castable requiring excellent abrasion resistance and relatively low thermal conductivity.

A first series of mixes was prepared (see Table I below). The mixes A, B, C, D and E included calcined fireclay, vitreous silica and casting grade cement in various proportions. The calcined fireclay used in mixes A through D was mined in Alabama and has essentially 50 weight percent alumina content. In mixes A, B and C, the weight percent of the calcined clay added to the refractory composition, comprised 35%, 25% and 15% respectively. In mixes D and E, 25% and 15%, by weight, of the calcined clay was included in the mix, but in the later two mixes, the fireclay calcines were made as fine as possible, while maintaining the desired screen analysis. This placed the silica in the coarser (+65 mesh) fractions. Bulk density, strength and abrasion resistance generally increased with increasing fireclay content. However, since thermal conductivity also increases with density, maximum abrasion resistance and minimum thermal conductivity could not be optimized simultaneously. Accordingly, the object of the test work was to obtain the lowest possible thermal conductivity at an abrasion resistance after 1500° F. reheat of 14 cc maximum volume loss. Mixes C and E had the lowest densities while reaching the abrasion resistance goal. Thermal conductivity tests were conducted on mixes C and E, but not on A, B and D. In analyzing the abrasion test resistance results, it should be noted that mix E had a 4 cc volume loss after drying at 250° F., whereas mix C had a 5.8 cc volume loss. Accordingly, it was concluded that mix E would provide a better quality commercial castable. Further, since mix E included substantially 100% of the calcined clay in the fines (−65 mesh) as compared to mix C, the production of mix E would be much easier when compared to the production of mix C. The constituents of each mix are provided on a weight percent basis.

TABLE I

| Mix Designation: | A | | B | | C | | D | | E | |
|---|---|---|---|---|---|---|---|---|---|---|
| Mix (weight %): | | | | | | | | | | |
| Ucal 50 (fireclay grain) | | | | | | | | | | |
| −3/+10 mesh | 15 | | 11 | | 6 | | — | | — | |
| −10/+28 mesh | 7 | | 5 | | 3 | | 4 | | — | |
| −28/+65 mesh | 6 | | 4 | | 3 | | 7 | | 1 | |
| −65 mesh | 7 | | 5 | | 3 | | 14 | | 14 | |
| Vitreous Silica (amorphous silica) | | | | | | | | | | |
| −3/+10 mesh | 10 | | 13 | | 17 | | 22 | | 22 | |
| −10/+28 mesh | 10 | | 13 | | 16 | | 18 | | 22 | |
| −28/+65 mesh | 4 | | 6 | | 6 | | — | | 6 | |
| −65 mesh | 6 | | 8 | | 11 | | — | | — | |
| 80% Alumina Calcium Aluminate Cement | 35 | | 35 | | 35 | | 35 | | 35 | |
| Tempering Water Required, Weight %: | 11.1 | | 11.0 | | 10.9 | | 11.0 | | 11.0 | |
| Method of Forming: | Vibration Cast | | | | | | | | | |
| Casting Characteristics | | | | | | | | | | |
| Flow: | | | | | Good | | | | | |
| Screeded: | | | | | Well | | | | | |
| Watering Out: | | | | | None | | | | | |
| Set Times by Gillmore Needles | | | | | | | | | | |
| Initial Set, minutes: | 30 | | 25 | | 25 | | 30 | | 25 | |
| Final Set, minutes: | 100 | | 110 | | 85 | | 100 | | 105 | |
| Bulk Density, pcf (ASTM C-134) | | | | | | | | | | |
| After Drying at 250° F. (Av 3): | 134 | | 131 | | 129 | | 132 | | 130 | |
| After 1500° F. Reheat (Av 3): | 126 | | 123 | | 121 | | 124 | | 122 | |
| After 2700° F. Reheat (Av 3): | 130 | | 125 | | 123 | | 134 | | Deformed | |
| Modulus of Rupture, psi (ASTM C-133) | | | | | | | | | | |
| After Drying at 250° F. (Av 3): | 1500 | | 1450 | | 1260 | | 1680 | | 1520 | |
| After 1500° F. Reheat (Av 3): | 1200 | | 1120 | | 990 | | 920 | | 840 | |
| After 2700° F. Reheat (Av 3): | 2090 | | 1730 | | 990 | | 1820 | | 1260 | |
| Cold Crushing Strength, psi (ASTM C-133) | | | | | | | | | | |
| After Drying at 250° F. (Av 3): | 10290 | | 9890 | | 10360 | | 10230 | | 10670 | |
| After 1500° F. Reheat (Av 3): | 8860 | | 8910 | | 8530 | | 9260 | | 8540 | |
| After 2700° F. Reheat (Av 3): | 6690 | | 6670 | | 4220 | | 8230 | | 2780 | |
| Apparent Porosity (ASTM C-20), %: | | | | | | | | | | |
| After Drying at 250° F. (Av 3): | 17.4 | | 16.7 | | 17.0 | | 16.4 | | 16.0 | |
| After 1500° F. Reheat (Av 3): | 24.2 | | 23.7 | | 22.8 | | 24.8 | | 24.9 | |
| After 2700° F. Reheat (Av 3): | 21.8 | | 23.7 | | 18.8 | | Not Run | | | |
| Reheat 1500° F. (Av 3) (ASTM C-269) | | | | | | | | | | |
| Linear Change, %: | 0.0 | | −0.1 | | +0.1 | | +0.1 | | +0.1 | |
| Volume Change, %: | +0.2 | | +0.3 | | +0.4 | | +0.4 | | ±0.4 | |
| Appearance After Reheat: | All mixes had a light pink color, sharp corners and edges, no cracking and a good ring when struck. | | | | | | | | | |
| Thermal Conductivity at 1000° F. BTU/ft² hr °F./in (ASTM C-201) | — | | — | | 6.2 | | — | | 6.5 | |
| Reheat 2700° F. (Av 3) | | | | | | | | | | |
| Linear Change, %: | −0.6 | | −0.1 | | −0.5 | | −2.2 | | −0.9 | |
| Volume Change, %: | −3.6 | | −1.7 | | −2.6 | | −9.6 | | Deformed | |
| Appearance After Reheat: | Mixes A, B, C Gray colored with vitrified surfaces, no warping, good ring when struck. | | | | | | | | | |
| | Mixes D & E Gray colored, heavily vitrified surfaces and stuck to setter. Both mixes had appearance of being coated with thick acrylic. E was more glazed than D. No warping or bloating. Good ring when struck. | | | | | | | | | |
| Abrasion Test (ASTM C-704) Volume Loss, cu cm | | | | | | | | | | |
| After Drying at 250° F. (Av 3): | 5.1 | | 5.7 | | 5.8 | | 5.5 | | 4.0 | |
| After 1500° F. Reheat (Av 3): | 11.5 | | 11.7 | | 13.2 | | 11.3 | | 12.9 | |
| Screen Analysis | | | | | | | | | | |
| % Held on 3 mesh | 1 | | 1 | | 1 | | 2 | | 3 | |
| 4 | 5 | 6 | 6 | 7 | 6 | 7 | 5 | 7 | 6 | 9 |
| 6 | 6 | | 6 | | 6 | | 6 | | 6 | |
| 8 | 4 | | 4 | | 3 | | 1 | | 1 | |
| 10 | 6 | 16 | 5 | 15 | 4 | 13 | 6 | 13 | 5 | 12 |
| 14 | 6 | | 6 | | 6 | | 8 | | 7 | |
| 20 | 7 | | 7 | | 7 | | 7 | | 7 | |
| 28 | 5 | 18 | 6 | 19 | 6 | 19 | 6 | 21 | 6 | 20 |
| 35 | 5 | | 5 | | 5 | | 3 | | 4 | |
| 48 | 4 | | 3 | | 3 | | 2 | | 3 | |
| 65 | 3 | 12 | 3 | 11 | 3 | 11 | 3 | 8 | 2 | 9 |

TABLE I-continued

| Mix Designation: | A | | B | | C | | D | | E | |
|---|---|---|---|---|---|---|---|---|---|---|
| 100 | 1 | | 2 | | 1 | | 2 | | 1 | |
| 150 | 3 | 4 | 2 | 5 | 4 | 5 | 5 | 7 | 4 | 5 |
| 200 | 2 | | 1 | | 3 | | 3 | | 3 | |
| 270 | 3 | | 4 | | 4 | | 4 | | 4 | |
| 325 | 3 | 8 | 4 | 9 | 3 | 10 | 3 | 10 | 4 | 11 |
| Pass 325 mesh | 36 | 36 | 34 | 34 | 35 | 35 | 34 | 34 | 34 | 34 |

Based upon the above test results, mix E was considered an excellent candidate for a refractory castable mix. While each of the mixes tested comprised 35 weight percent cement, and the preferred mix comprised 15 weight percent ball milled calcined clay, and 50 weight percent vitreous silica, the range of each of the constituents of the mix may vary as follows: 40-96 weight percent +65 mesh amorphous silica, 2-50 weight percent −65 mesh calcined high density refractory aggregate fines of at least 140 lb/ft$^3$, such as fireclay, tabular alumina, bauxite, MgAl or mixtures thereof, and 2-40 weight percent calcium alumina cement.

Additional work was conducted in an attempt to utilize mix E composition for producing both refractory castables and gunning mixes. In addition, fused silica was substituted for vitreous silica, in an attempt to determine if amorphous forms of silica, other than vitreous silica, could also be utilized. In reviewing the data developed in Table II below, mixes A through F included fused silica whereas, mix G included for comparison purposes, vitreous silica. The additions of various additives to the mixes were as illustrated. Mix C gunned well and shows superior properties compared to mix A which did not contain the gunning additive. Mix C had properties similar to mix E of Table I. In mixes B and D, a vinyl chloride acetate additive used in some mixes to improve spalling resistance was added; however, the resultant mixes showed some loss of strength and abrasion resistance. The foregoing was particularly evidenced in mix D which contained the gunning additive calcium chloride dihydrate as well as the vinyl chloride acetate additive. Mixes E and F included stainless steel fibers; these mixes had respectable properties. In comparing mixes C and F, it should be noted that the addition of steel fibers to mix F had a minor adverse affect on properties. In comparing mixes C and G (fused silica versus vitreous silica) it should be noted that the fused silica based mix had superior properties.

TABLE II

| Mix Designation: | A | B | C | D | E | F | G |
|---|---|---|---|---|---|---|---|
| Mix (weight %) | | | | | | | |
| Calhoun Field Grade Fused Silica | | | | | | | |
| −3/+10 mesh | | | | 27% | | | — |
| −10/+28 mesh | | | | 14 | | | — |
| −28/+65 mesh | | | | 9 | | | — |
| −65 mesh | | | | — | | | — |
| Vitreous Silica | | | | | | | |
| −3/+10 mesh | | | | — | | | 22% |
| −10/+28 mesh | | | | — | | | 22 |
| −28/+65 mesh | | | | — | | | 6 |
| Ucal 50 BMF (48% −325) | | | | 15 | | | 15 |
| Gunning Grade 80% | | | | 35 | | | 35 |
| Alumina Calcium Aluminate Cement | | | | | | | |
| Plus Additions | | | | | | | |
| Calcium Chloride Dihydrate | — | — | 0.2 | 0.2 | — | 0.2 | 0.2 |
| Vinyl Chloride Acetate | — | 0.2 | — | 0.2 | — | — | — |
| Ribtec GR, 1″ Steel Fibers | — | — | — | — | 2.0 | 2.0 | — |
| Predampening Moisture, Weight %: | 5 | 4 | 4 | 4 | 4 | 4 | 4 |
| Air Pressure: Material Pressure, psi: | 40:25 | 40:20 | 40:20 | 40:20 | 40:25 | 40:25 | 40:25 |
| Aging Time in Gun, min: | 10–15 | 10–15 | 0 | 0 | 10–15 | 0 | 0 |
| Moisture (Dry Basis), % | | | | | | | |
| Panel: | 9 | 10 | 8 | 11 | 9 | 9 | 11 |
| Rebounds: | 4 | 5 | 5 | 7 | 4 | 4 | 5 |
| Rebound Losses, %: | 30 | 20 | 25 | 20 | 37 | 29 | 10 |
| Rebound Factor*: | 1.43 | 1.25 | 1.33 | 1.25 | 1.59 | 1.41 | 1.11 |
| Gunning Characteristics: | Mix A - | Gunned well. Wet up well with average water range. Some surging in feed line. Low dusting. Good panel. | | | | | |
| | Mix B - | Gunned well. Panel wet up well with good flow and narrow water range. High dusting. Good panel. | | | | | |
| | Mix C - | Gunned well. Wet up well with good water range. Slight surging in feed line. Low dusting. Good panel. | | | | | |
| | Mix D - | Gunned very well. Wet up well with good flow. Wide water range. Moderate dusting. Good panel. | | | | | |
| | Mix E - | Gunned well. Wet up well with good flow. Wide water range. Some dusting. Good panel. | | | | | |
| | Mix F - | Gunned very well. Wet up well with good flow. Wide water range. Low dusting. Good panel. | | | | | |

TABLE II-continued

| Mix Designation: | A | B | C | D | E | F | G |
|---|---|---|---|---|---|---|---|
| | | | Mix G - | Gunned very well. Wet up well with good flow. Wide water range. Slight dusting. Good panel. | | | |

*Rebound Factor = Wt. of Material Gunned/(Wt of Material Gunned - Wt. of Rebounds)

To Use Rebound Factor (Material Needed for Gunned Installation) = Volume of Total Installation X Bulk Density of Gunned Material After 1500° F. Reheat X Rebound Decimal Factor + Fraction of Trim Loss

| | A | B | C | D | E | F | G |
|---|---|---|---|---|---|---|---|
| Bulk Density, pcf (ASTM C-134) | | | | | | | |
| After Drying at 250° F. (Av 3): | 128 | 125 | 128 | 123 | 129 | 127 | 126 |
| After 1500° F. Reheat (Av 3): | 119 | 116 | 120 | 115 | 119 | 118 | 118 |
| After Drying at 250° F. (Av 3): | 1650 | 1380 | 1520 | 1320 | 1530 | 1450 | 1340 |
| After 1500° F. Reheat (Av 3): | 920 | 780 | 940 | 790 | 890 | 790 | 650 |
| Cold Crushing Strength, psi (ASTM C-133) | | | | | | | |
| After Drying at 250° F. (Av 3): | 6830 | 6890 | 8720 | 6030 | 7900 | 9230 | 5590 |
| After 1500° F. Reheat (Av 3): | 5870 | 4450 | 7440 | 4140 | 7250 | 7430 | 4500 |
| Reheat 1500° F. (Av 3) (ASTM C-269) | | | | | | | |
| Linear Change, %: | −0.1 | −0.1 | −0.1 | −0.1 | 0.0 | −0.1 | −0.1 |
| Volume Change, %: | −0.3 | −0.2 | −0.4 | −0.4 | −1.0 | −0.5 | ±0.3 |
| Abrasion Index (ASTM C-704) cc Loss After 1500° F. Reheat (Av 3): | 16.5 | 15.6 | 11.7 | 18.2 | 9.2 | 12.5 | 16.9 |
| Screen Analysis | | | | Desired | | | Desired |
| % Held on 3 mesh | | | | | | 1 | |
| 4 | | | 2 | 2 | | 6 | 7 |
| 6 | | | 5 | | | 5 | |
| 8 | | | 2 | | | 1 | |
| 10 | | | 11 | 18 | 20 ± 3 | 5 | 11 | 20 ± 3 |
| 14 | | | 10 | | | 7 | |
| 20 | | | 5 | | | 8 | |
| 28 | | | 3 | 18 | 20 | 6 | 21 | 20 |
| 35 | | | 5 | | | 5 | |
| 48 | | | 5 | | | 4 | |
| 65 | | | 4 | 14 | 10 ± 3 | 3 | 12 | 10 ± 3 |
| 100 | | | 1 | | | 2 | |
| 150 | | | 1 | 2 | | 1 | 3 |
| 200 | | | 4 | | | 3 | |
| 270 | | | 4 | | | 4 | |
| 325 | | | 1 | 9 | 40 | 2 | 9 | 50 |
| Pass 325 mesh | | | 37 | 37 | (−65) | 37 | 37 | (−65) |

In addition to the properties of high abrasion resistance and low thermal conductivity, certain applications require compositions to have good flowability and long working times. Such properties are required in lining transfer lines of fluid catalytic cracking units. Mix H identified below, was formed in an attempt to obtain all the desired properties in one mix. Mix H is based upon mix E previously discussed. In addition, Mix H includes volatilized silica and −325 mesh alumina. The −325 mesh alumina is provided to improve the abrasion resistance, while both the volatilized silica and alumina are provided to improve the flowability.

Tests disclosed in co-pending application U.S. Ser. No. 748,260, filed 6/24/85, now abandoned, entitled "Abrasion Resistant Refractory Composition, Thomas Russell Kleeb, inventor, it was determined that the preferred ranges for the volatilized silica and −325 mesh alumina, are about 0.5 to 5.0 weight percent, and about 3.0 to 15 weight percent, respectively.

In the preferred embodiment, ALCOA's A-17 reactive alumina was used to obtain the −325 mesh alumina of the mix. The A-17 reactive alumina is almost entirely composed of fine, sintered corundum (alpha-alumina) crystals. Their high surface area and small crystal size makes them thermally reactive, that is, they will further sinter or react with other compounds at relatively low temperatures. Tabular alumina and calcined alumina may also be used as the alumina constituent of the mix.

TABLE III

| Mix Designation: | H |
|---|---|
| Mix: (weight percent) | |
| Vitreous Silica (Fulton Works) | |
| −3 +10 mesh | 21% |
| −10 +28 mesh | 21 |
| −28 +65 mesh | 8 |
| −65 mesh | — |
| Calcined S.D. Flint (BMF 53) | 5 |
| A-17 Reactive Alumina | 9 |
| Reynolds VS Silica | 1 |
| CA-25 Cement | — |
| CA-25C Casting Grade Cement | 35 |
| Tempering Water (70° F.), %: | 9.7 |
| Mixing Time, min.: | 8 |
| Set Times by Gillmore Needles | |
| Initial, min.: | 15 |
| Final, min.: | 95 |
| Working Time (During Which a Tempered Sample Sealed in Polyethylene Could be Placed by Vibration), min.: | 80 |
| Casting Characteristics: Vibration - cast well at dry BIH consistency. Slightly sticky and stiff. Excellent flow. | |
| Bulk Density, pcf (ASTM C-134) | |
| After Drying at 250° F.: | 132 |
| After 1500° F. Reheat: | 123 |
| Modulus of Rupture, psi (ASTM C-133) | |
| After Drying at 250° F.: | 1150 |
| After 1500° F. Reheat: | 670 |
| Cold Crushing Strength, psi (ASTM C-133) | |
| After Drying at 250° F.: | 9800 |
| After 1500° F. Reheat: | 7480 |
| Reheat 1500° F. (ASTM C-269) | |
| Linear Change, %: | 0.0 |
| Volume Change, %: | +0.5 |

TABLE III-continued

| Mix Designation: | H | | |
|---|---|---|---|
| Abrasion Test (ASTM C-704) | 11.6 | | |
| Volume Loss After 1500° F. | | | |
| Reheat, cu cm (Av 3): | | | |
| Range: | 11.0-12.2 | | |
| Screen Analysis | | | Desired |
| % Held on 3 mesh | T | | |
| 4 | 5 | 5 | |
| 6 | 7 | | |
| 8 | 3 | | |
| 10 | 4 | 14 | 20 ± 3 |
| 14 | 5 | | |
| 20 | 7 | | |
| 28 | 6 | 18 | 20 |
| 35 | 5 | | |
| 48 | 3 | | |
| 65 | 3 | 11 | 10 |
| 100 | 1 | | |
| 150 | 1 | 2 | |
| 200 | 1 | | |
| 270 | 3 | | |
| 325 | 2 | 6 | (−65) |
| Pass 325 mesh | 44 | 44 | 50 ± 3 |

The composition of the present invention provides a refractory castable or gunning mix which may be used in applications requiring high abrasion resistance and low thermal conductivity properties; such properties are required in transfer lines of fluid catalytic cracking and fluid coking units.

The utility of the present invention in energy savings may be seen from the following example in which it is assumed that conventional prior art material has a thermal conductivity of $$8.5 \frac{\text{BTU in}}{\text{HR Ft}^{2\circ}/\text{F.}}$$

and the presently claimed material has a thermal conductivity of only $$6.5 \frac{\text{BTU in}}{\text{HR Ft}^{2\circ}/\text{F.}}$$

EXAMPLE I

Heat Saving—A comparison of prior art and patent composition E (as per Table I)

$$\text{Prior art material } 8.5 \frac{\text{BTU in}}{\text{HR Ft}^{2\circ}/\text{F.}}$$

$$\text{Composition E } 6.5 \frac{\text{BTU in}}{\text{HR Ft}^{2\circ}/\text{F.}}$$

Assume 5" lining thickness with 1350° F. hot face.
Assume 80° F. still air ambient.
Assume heat value of $5 per MBTU.

$$R_1 = L_1/K_1 = 5/8.5 = 0.59$$

$$R_2 = L_2/K_2 = 5/6.5 = 0.77$$

| | Cold Face Temperature | Heat Loss BTU/FT² HR |
|---|---|---|
| Prior Art Material | 440° F. | 1500 |
| Composition E | 392° F. | 1180 |
| Δ Heat Loss | | 320 |

Value of Δ Heat Loss =

$$\left(\frac{320 \text{ BTU}}{\text{FT}^2\text{HR}}\right)\left(\frac{24 \text{ HR}}{\text{DAY}}\right)\left(\frac{365 \text{ DAY}}{\text{YEAR}}\right)\left(\frac{5 \text{ Dollars}}{\text{MBTU}}\right)$$

= $14 per Sq. Ft. per year.

In the present specification, all mesh sizes have been determined in accordance with Taylor Standard Series.

While a preferred embodiment of the present invention has been described and illustrated, the invention should not be limited thereto but may be otherwise embodied within the scope of the following claims.

The embodiments of the invention in which an exclusive property or privilege is claimed are defined as follows:

1. A refractory composition consisting essentially of: (A) about 40 to about 96 weight percent amorphous silica; (B) about 2 to about 50 weight percent −65 mesh calcined refractory aggregate having a density of at least about 140 lb/ft³; and (C) about 2 to about 40 weight percent calcium aluminate cement.

2. The composition of claim 1 wherein the refractory aggregate is selected from the class consisting of fireclay, tabular alumina, bauxite, MgAl and mixtures thereof.

3. The composition of claim 2 wherein the refractory composition consists essentially of between about 40 and about 60 weight percent +65 mesh amorphous silica.

4. The composition of claim 3 wherein the refractory aggregate consists essentially of between about 10 and about 35 weight percent −65 mesh material.

5. The composition of claim 4 wherein the cement consists essentially of between about 20 and 40 weight percent.

6. The composition of claim 5 wherein the refractory aggregate consists essentially of fireclay fines.

7. A refractory composition consisting essentially of: (A) about 40 to 92 weight percent amorphous silica; (B) about 2 to about 50 weight percent −65 mesh calcined refractory aggregate having a density of at least 140 lb/ft³; (C) about 2 to about 40 weight percent calcium aluminate cement; (D) about 0.5 to about 5 weight percent volatilized silica; and (E) about 3.0 to about 15 weight percent −325 mesh alumina.

8. The composition of claim 7 wherein the refractory aggregate is selected from the class consisting of fireclay, tabular alumina, bauxite, MgAl and mixtures thereof.

9. The composition of claim 8 wherein the refractory composition consists essentially of between about 40 and about 60 weight percent +65 mesh amorphous silica.

10. The composition of claim 9 wherein the refractory aggregate consists essentially of between about 10 and about 35 weight percent −65 mesh material.

11. The composition of claim 7 wherein the refractory aggregate consists essentially of fireclay fines.

12. The composition of claim 11 wherein the fireclay fines consists essentially of between about 4.5 and about 12 weight percent of the refractory aggregate.

13. The composition of claim 7 including the addition of tempering water for using the composition as a refractory castable characterized by relatively high abrasion resistance.

14. A refractory composition consisting essentially of:
about 40 to about 96 weight percent amorphous silica;
about 2 to about 50 weight percent −65 mesh calcined refractory aggregate selected from the class consisting of tabular alumina, bauxite; and
about 2 to 40 weight percent calcium aluminate cement.

* * * * *